United States Patent Office 3,576,841
Patented Apr. 27, 1971

3,576,841
PREPARATION OF BIS-HYDROXYALKYL
PHTHALATE ESTERS USING STERICALLY
HINDERED AMINE CATALYSTS
Donald R. Larkin, P.O. Box 2768,
Corpus Christi, Tex. 78403
No Drawing. Continuation of application Ser. No.
576,555, Sept. 1, 1966. This application Jan. 19,
1970, Ser. No. 4,441
Int. Cl. C07c 69/80, 69/82
U.S. Cl. 260—475
9 Claims

ABSTRACT OF THE DISCLOSURE

Process for the production of hydroxyalkyl esters of benzene dicarboxylic acids by reacting alkylene oxides with the acids in the presence of sterically hindered amine catalysts such as alkyl substituted quinolines, pyridines, and piperidines.

---

This is a continuation of U.S. Ser. No. 576,555, filed Sept. 1, 1966, now abandoned.

This invention relates to an improvement in the preparation of bis(hydroxyalkyl) esters of benzene dicarboxylic acid, and more particularly relates to the preparation of bis(hydroxyalkyl) esters of terephthalic acid or isophthalic acid. Bis($\beta$-hydroxyethyl) terephthalate, for example, is especially useful in the preparation of synthetic resins useful for their fiber and film-forming properties. More particularly, this invention relates to the preparation of bis($\beta$-hydroxyethyl) terephthalate using sterically hindered amine catalysts.

Typically, bis(hydroxyalkyl) esters of benzene dicarboxylic acids have been made by treating a slurry of benzene dicarboxylic acid in a large amount of water or an inert organic solvent with an alkylene oxide in the presence of a suitable catalyst, such as a tertiary amine or alkali hydroxide. For example, see U.S. Pats. Nos. 2,932,662, 3,037,049, 3,101,366, British Pat. No. 623,669, and Belgian Pat. No. 660,257. In preparing the esters by the above processes, the crude product has been found to contain low molecular weight polymeric ethylene glycol, as noted in U.S. Pat. No. 3,120,560. It is important that the polymeric ethylene glycol content be as low as possible in the crude product as excessive amounts, when incorporated in poly(ethylene terephthalate), lower the transition temperature of the polymer and make it unfit for use as, for example, tire cord.

It is thus an object of this invention to produce a hydroxyalkyl ester of a benzene dicarboxylic acid having an amount of low molecular weight polymeric glycol substantially lower than that known heretofore.

It is a further object of this invention to produce bis ($\beta$-hydroxyethyl) terephthalate using sterically hindered amine catalysts which greatly reduce the amount of diethylene glycol in the crude reaction product.

These and other objects are accomplished by reacting an alkylene oxide having from 2 to 6 carbon atoms with a benzene dicarboxylic acid in an aqueous or inert organic reaction media in the presence of a sterically hindered amine catalyst under appropriate reaction conditions.

The reaction media in which the process of this invention may be carried out can be either an aqueous system or an inert organic media. Exemplary of the inert organic compounds which may be used are alcohols, ketones, ethers, alkyl benzenes, halogenated hydrocarbons, alkyl esters, nitriles, nitrobenzene, and paraffinic hydrocarbons. Specific examples of compounds which may be used are acetone, methylethylketone, methylisopropylketone, methylisoamylketone, ethyl butyl ketone, cyclohexanone, benzene, toluene, xylene, hexane, heptane, chloroform, carbontetrachloride, dichloroethane, trichloroethane, tetrachloroethane, chlorobenzene, bromoform, dibromethane, iodide hydrocarbons, fluorocarbons, dioxane, ethyl acetate, propyl acetate, butyl acetate, isopropyl ether, dibutyl ether, ethanol, the propanols, the butanols, the pentanols, nitrobenzene, benzonitrile, and mixtures.

Theoretically, 2 molar equivalents of alkylene oxide are required to react with the benzene dicarboxylic acid, however, about 1.5 to 5.0 moles of alkylene oxide per mole of terephthalic acid can be used, and preferably from 2.0 to 4.0 moles alkylene oxide per mole of terephthalic acid is used.

The reaction should be carried out at a temperature ranging from about 60 to 200° C. and preferably from about 80 to 150° C. for a time ranging from about 30 minutes to 3 hours.

It is usually desirable to carry out the reaction in the presence of an inert gas such as nitrogen, helium, etc.

The reaction is preferably carried out under a pressure ranging from about 3 to 500 p.s.i.g., and preferably of 100 to 300 p.s.i.g.

Suitable alkylene oxides which may be used include ethylene oxide, propylene oxide, and butylene oxide.

The particular catalyst used in the process of this invention is important. Amine catalysts have been used in prior processes for the preparation of bis(hydroxyalkyl) esters of benzene dicarboxylic acids. Such known catalysts include quaternary ammonium salts, such as tetramethyl ammonium chloride or bromide; tertiary amines, such as trimethylamine, triethylamine, pyridine, and picoline; secondary amines, such as diethylamine, dimethylamine, piperidine; primary amines, such as aniline, monomethylamine, and ethanolamine. It has now been found that sterically hindered amine catalysts reduce by a substantial amount the diethylene glycols produced during the esterification reaction between ethylene oxide and terephthalic acid. Diethylene glycol combined with terephthalic acid has been found to lower the transition temperature of polyethylene terephthalate and make the polyester unfit for certain industrial uses; thus it is desirable that the production of diethylene glycol be kept to a minimum. Normally, when amine catalysts of the prior art are used, the crude reaction product contains from 1.5 to 2.0 mole percent diethylene glycol. When using the preferred catalysts of this invention the diethylene glycol content is reduced to less than 1.0 mole percent. Sterically hindered amines which may be used in the process of this invention include:

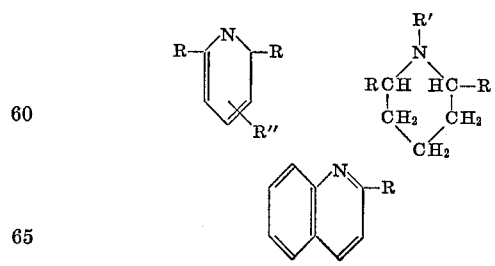

where R is an alkyl radical having from 1 to 3 carbon atoms, R' is an alkyl radical having from 1 to 5 carbon atoms, and R" is hydrogen or an alkyl radical having from 1 to 5 carbon atoms. Specific compounds which can be used in the process of this invention are 2,6-dimethyl pyridine, 2,4,6-trimethyl pyridine, 2-methyl quinoline and N-propyl-2,6-dimethyl piperidine.

The amount of catalyst used may vary from 0.01 to 5% and preferably from 0.5 to 2% by weight based on the benzene dicarboxylic acid used.

The process of this invention can be described using ethylene oxide as the alkylene oxide, terephthalic acid as the benzene dicarboxylic acid, xylene as the solvent, and a sterically hindered amine catalyst, as follows:

A slurry of terephthalic acid in xylene is fed along with ethylene oxide into an agitated reaction zone maintained under nitrogen pressure. The mixed feed is heated to the reaction temperature and the catalyst introduced. After a residence time of from 5 to 60 minutes, the hot reaction mixture is removed and filtered to remove unreacted terephthalic acid. The filtrate is cooled and the bis($\beta$-hydroxyethyl) terephthalate precipitated. The solid bis($\beta$-hydroxyethyl) terephthalate is centrifuged from the mother liquor and the solvent and excess ethylene oxide separated. The solvent is recycled after suitable purification. The crude bis($\beta$-hydroxyethyl) terephthalate is then further purified, if desired, by recrystallization or other means.

The following examples are given by way of illustration and not limitation.

EXAMPLE I

Bis($\beta$-hydroxyethyl) terephthalate was prepared using triethylamine as the catalyst by prior art techniques. A mixture of 600 g. of terephthalic acid, 473 g. of ethylene oxide and 11 g. of triethylamine catalyst in 1600 ml. of p-xylene was heated to 110° C. for 90 minutes. The reaction mixture was filtered to recover 8 g. of unreacted terephthalic acid. The filtrate was cooled to 0° C. and 806 g. of 98+ percent purity bis($\beta$-hydroxyethyl) terephthalate was obtained. The crude bis($\beta$-hydroxyethyl) terephthalate contained 1.56 mole percent diethylene glycol.

EXAMPLE II

A mixture of 600 g. of terephthalic acid, 473 g. of ethylene oxide and 13 g. of 2,6-dimethylpyridine catalyst in 1600 ml. of p-xylene was heated to 110° C. for 150 minutes. The reaction mixture was filtered to recover 500 g. of unreacted terephthalic acid. The filtrate was cooled to 0° C. and 130 g. of 99+ percent bis($\beta$-hydroxyethyl) terephthalate was obtained. This crude bis($\beta$-hydroxyethyl) terephthalate contained less than 0.18 mole percent diethylene glycol.

EXAMPLE III

A mixture of 600 g. of terephthalic acid, 473 g. of ethylene oxide, and 15 g. of N-propyl-2,6-dimethyl piperidine catalyst was heated in 1600 ml. of p-xylene for 50 minutes at a temperature of 130° C. with agitation in a nitrogen filled autoclave. The reaction mixture was filtered to recover 40 g. of unreacted terephthalic acid. The filtrate was then cooled to 10° C. and 820 g. of 99+ percent purity bis($\beta$-hydroxyethyl) terephthalate was obtained. The crystals were removed from the mother liquor by filtration and analyzed. The crude bis($\beta$-hydroxyethyl) terephthalate glycol content of 0.71 mole percent.

What is claimed is:

1. In the process for the production of hydroxyalkyl esters of benzene dicarboxylic acids by the reaction of an alkylene oxide having from 2 to 6 carbon atoms with a benzene dicarboxylic acid in an inert organic reaction medium, the improvement which comprises effecting said reaction in the presence of a sterically hindered amine catalyst whereby the amount of low molecular weight polymeric ethylene glycol impurity is reduced, said amine catalyst being one selected from the group consisting of:

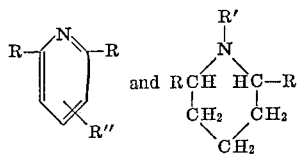

where R is an alkyl radical having from 1 to 3 carbon atoms, R' is an alkyl radical having from 1 to 5 carbon atoms, and R" is hydrogen or an alkyl radical having from 1 to 5 carbon atoms.

2. The process of claim 1 wherein said amine catalyst is one of the formula:

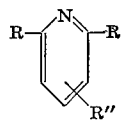

3. Process according to claim 1 wherein the inert organic reaction medium is one selected from the group consisting of alcohols, ketones, ethers, alkyl benzenes, halogenated hydrocarbons, alkyl esters, and paraffinic hydrocarbons.

4. Process according to claim 11 wherein the reaction is carried out at a temperature ranging from about 60 to 200° C.

5. Process according to claim 1 wherein the alkylene oxide is ethylene oxide and the benzene dicarboxylic acid is terephthalic acid.

6. Process according to claim 5 wherein the molar ratio of ethylene oxide to terephthalic acid ranges from about 1.5 to 5.

7. In the process for the production of bis(hydroxyalkyl) esters of benzene dicarboxylic acids by the reaction of an alkylene oxide having from 2 to 6 carbon atoms with a benzene dicarboxylic acid in an aqueous reaction medium, the improvement which comprises effecting said reaction in the presence of a sterically hindered amine catalyst whereby the amount of low molecular weight polymeric ethylene glycol impurity is reduced, said amine catalyst being one selected from the group consisting of:

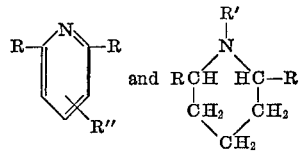

where R is an alkyl radical having from 1 to 3 carbon atoms, R' is an alkyl radical having from 1 to 5 carbon atoms, and R" is hydrogen or an alkyl radical having from 1 to 5 carbon atoms.

8. Process according to claim 7 wherein the reaction is carried out at a temperature ranging from about 60 to 200° C.

9. Process according to claim 7 wherein the alkylene oxide is ethylene oxide and the benzene dicaboxylic acid is terephthalic acid.

References Cited

UNITED STATES PATENTS

| | | | |
|---|---|---|---|
| 3,037,049 | 5/1962 | Vaitekunas | 260—475 |
| 3,360,545 | 12/1967 | Wygant | 260—485 |
| 3,397,224 | 8/1968 | Fujita et al. | 260—475 |
| 3,414,608 | 12/1968 | Fujita et al. | 260—475 |

LORRAINE A. WEINBERGER, Primary Examiner

E. J. SKELLY, Assistant Examiner

UNITED STATES PATENT OFFICE
CERTIFICATE OF CORRECTION

Patent No. 3,576,841    Dated April 27, 1971

Inventor(s) Donald R. Larkin

It is certified that error appears in the above-identified patent and that said Letters Patent are hereby corrected as shown below:

Column 4, line 27, claim reference numeral "11" should read -- 1 --.

Signed and sealed this 18th day of January 1972.

(SEAL)
Attest:

EDWARD M. FLETCHER, JR.
Attesting Officer

ROBERT GOTTSCHALK
Acting Commissioner of Patents